United States Patent [19]
Steigerwald

[11] Patent Number: 5,566,011
[45] Date of Patent: Oct. 15, 1996

[54] ANTIFLECTOR BLACK MATRIX HAVING SUCCESSIVELY A CHROMIUM OXIDE LAYER, A MOLYBDENUM LAYER AND A SECOND CHROMIUM OXIDE LAYER

[75] Inventor: Michael L. Steigerwald, Martinsville, N.J.

[73] Assignee: Luncent Technologies Inc., Murray Hill, N.J.

[21] Appl. No.: 351,969

[22] Filed: Dec. 8, 1994

[51] Int. Cl.$^6$ .................... G02F 1/1335; G02F 1/1333
[52] U.S. Cl. .................... 359/67; 359/68; 428/209; 428/332
[58] Field of Search ............... 359/67, 87; 204/192.26, 204/192.27, 197.28; 428/432, 203, 209; 430/5

[56] References Cited

U.S. PATENT DOCUMENTS

| | | | |
|---|---|---|---|
| 4,139,443 | 2/1979 | Sakurai | 204/192.26 |
| 4,166,148 | 8/1979 | Sakurai et al. | 428/332 |
| 4,178,403 | 12/1979 | Sakurai et al. | 428/209 |
| 4,363,846 | 12/1982 | Kaneki | 428/203 |
| 4,530,891 | 7/1985 | Nagarekawa et al. | 430/5 |
| 4,563,407 | 1/1986 | Matsui et al. | 430/5 |
| 4,657,648 | 4/1987 | Nagarekawa et al. | 204/192.26 |
| 4,696,877 | 9/1987 | Matsui et al. | 430/5 |
| 4,720,442 | 1/1988 | Shinkai et al. | 430/5 |
| 5,282,070 | 1/1994 | Nishida et al. | 359/67 |
| 5,294,506 | 3/1994 | Imai | 430/5 |
| 5,361,153 | 11/1994 | Shimamune et al. | 359/87 |
| 5,412,494 | 5/1995 | Ishiwata et al. | 359/67 |
| 5,418,094 | 5/1995 | Sato et al. | 359/67 |

FOREIGN PATENT DOCUMENTS 5-127014  9/1993  Japan.

*Primary Examiner*—Anita Pellman Gross
*Assistant Examiner*—Toan Ton

[57] ABSTRACT

A black matrix structure suitable for use in an active matrix liquid crystal display is described. The novel antireflective black matrix comprises successive layers of chromium oxide, a metal selected from among chromium, tungsten, molybdenum, vanadium, iron and niobium, a second layer of chromium oxide and a chromium mirror, all of which are deposited upon the front surface of a glass substrate member. An alternate structure includes the same sequence of layering on the back surface of the chromium mirror. The described black matrixes reduce reflectance of incident light to less than 0.5%.

4 Claims, 1 Drawing Sheet

5,566,011

ANTIFLECTOR BLACK MATRIX HAVING SUCCESSIVELY A CHROMIUM OXIDE LAYER, A MOLYBDENUM LAYER AND A SECOND CHROMIUM OXIDE LAYER

FIELD OF THE INVENTION

This invention relates to liquid crystal display devices. More particularly, the present invention relates to active matrix liquid crystal displays including an antireflective black matrix and to a technique for the preparation thereof.

BACKGROUND OF THE INVENTION

During the past two decades, there has been a birth of interest in a class of devices commonly referred to as electroluminescent displays which are solid state devices that use the direct production of light in thin films to provide displays of satisfactory appearance at moderate cost.

This technology led to the development of liquid crystal displays based upon a phenomenon known as dynamic scattering wherein current is passed through a nematic liquid crystal, so causing the material to break up into domains having randomly directed axes. The next stage in the development of such devices involved the fabrication of a twisted nematic display in which a nematic liquid crystal is disposed intermediate two closely spaced glass plates coated with a polymer and rubbed such that the nematic liquid crystal is aligned parallel to the rubbing direction. If the plates are rubbed at 90 degree angles, the liquid crystal deforms into a twisted structure. Passage of polarized light through the display results in the plane of polarization following the twist. The application of an electric field to the display permits the liquid crystals to rotate and align themselves with the field, thereby leading to disruption of the twist and rotation of polarization. This permits either full transmission or no transmission in the display.

Later developments in the field led to the generation of thin film transistor/liquid crystal displays and to color liquid crystal displays. In the case of the latter, workers in the art have recognized that a reduction in efficiency is ofttimes encountered by absorption of light in the color filters. Accordingly, efforts have continued to alleviate or eliminate this limitation.

Heretofore, the most common technique for overcoming this problem has been to design an active matrix liquid crystal display including a glass substrate (front glass plate) having a black matrix typically comprising chromium oxide deposited upon a portion thereof. The purpose of this matrix is to define and outline individual pixels which is of particular importance for color displays in providing a separator between the elements of the color filter from each other.

Additionally, the black matrix serves to mask the electronics on the back plate of the device, thereby providing protection therefor from ambient light and associated photodegradation.

Black matrix structures employed heretofore typically comprise a grid of black lines, usually of the order of 20 nanometers in thickness spaced so as to provide an array of open opaque rectangles, typically 100 μm on a side. The black matrix is also chosen to minimize reflection of light which tends to result in the degradation of the display.

In the past, numerous approaches for attaining this end have been employed by those skilled in the art. Thus, for example, black matrixes have included grids made from (a) dyed black photoresists, (b) photoresists impregnated with carbon black, (c) patterned chromium, (d) patterned chromium/chromium oxide, and (e) patterned chromium/chromium oxide/chromium trilayers. Both the bilayer and the trilayer structures have been engineered to minimize reflectance of the matrix. Studies have revealed that the best of the matrixes among these prior art structures evidences an average reflectance of approximately 3%. Accordingly, efforts have continued in the search to enhance this characteristic

SUMMARY OF THE INVENTION

In accordance with the present invention, this end has been attained by the fabrication of a novel black matrix structure which has evidenced the ability to reduce reflectance of incident light to less than 0.5%.

The structure of interest is constructed of four layers deposited successively upon the back side of a suitable front glass substrate member, the layers being comprised of chromium oxide, a metal, chromium oxide and a chromium mirror. Alternatively, the structure may be double sided and include a black matrix of the same type on the back side of the chromium mirror employed herein, so forming a seven layer structure.

BRIEF DESCRIPTION OF THE DRAWING

The invention will be more readily understood by reference to the following detailed description taken in conjunction with the accompanying drawing wherein.

DETAILED DESCRIPTION OF THE INVENTION

Figure 1:
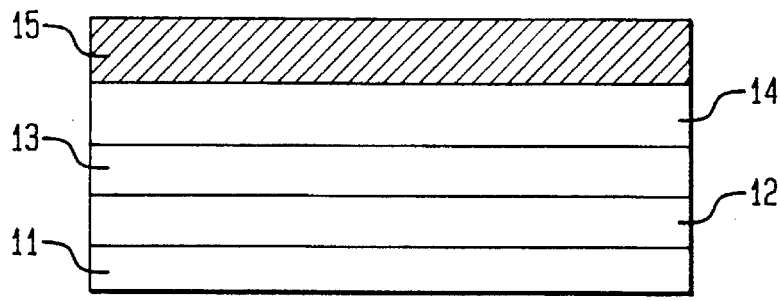
FIG. 1 is a front elevational view in cross-section of of a four layer black matrix structure prepared in accordance with the present invention.

The first step in the practice of the present invention involves selection of a suitable substrate for use in the liquid crystal display to be prepared. For this purpose, it is common practice to employ a conventional glass plate obtained from commercial sources. The glass plate so chosen is then placed within a cathodic sputtering chamber having a chromium target and reactive sputtering effected in the presence of oxygen to yield a first chromium oxide layer on the substrate having a thickness ranging from 35–41 nanometers.

Thereafter, the oxygen flow in the chamber is terminated and the chromium target either kept in place or replaced by a target comprising a metal selected from the group including tungsten, vanadium, iron, molybdenum and niobium. Then, sputtering is effected to yield a metal coating upon the first chromium oxide coating having a thickness ranging from 10 to 30 nanometers. The thickness of the metal film is dictated by considerations relating to minimizing the reflectance of the front face of the entire structure.

Next, the chromium target is again inserted in the sputtering chamber (if previously removed) and reactive sputtering in the presence of oxygen again effected to yield a second chromium oxide layer upon the metal layer, said second chromium oxide layer having a thickness ranging from 37–42 nanometers. Thickness of the second chromium oxide layer is also determined by considerations relating to minimizing the reflectance of the front face of the entire structure.

Then, a chromium mirror is deposited upon the second chromium oxide layer by cathodic sputtering of chromium in the sputtering chamber employed in the practice of the invention to yield the desired four layer black matrix which has been found to reduce the reflectance of incident light to less than 0.5%. The black matrix structure is then removed from the sputtering chamber and patterning effected by conventional photolithographic techniques including etching to define the desired pixel windows. Studies have revealed that the thicknesses of the three middle layers of the black matrix structure of the invention are interdependent and critical. In Table I set forth below, the optimized thicknesses of each of the layers with metals of interest for use herein are noted. In each case, the thickness of the chromium oxide layers is in the range of tens of nanometers and the thickness of the metal layer ranges from 10–30 nanometers. It will be noted that average reflectances in each case are significantly lower than those reported for similar prior art structures.

TABLE I $Cr/Cr_2O_3/M/Cr_2O_3$ Four Layer Antireflector
Cr mirror/Cr2O3/M/Cr2O3/glass mirror thickness: 100 nm

| M | oxide 1 (nm) | M (nm) | oxide 2 (nm) | ave reflectance (%) |
|---|---|---|---|---|
| Zr | 28.71 | 31.36 | 5.24 | 0.6 |
| Mo | 35.61 | 10.72 | 42.1 | 0.4 |
| W | 28.34 | 14.68 | 44.04 | 0.4 |
| V | 48.24 | 18.73 | 37.87 | 0.4 |
| Fe | 47.91 | 14.19 | 42.1 | 0.3 |
| Cr | 55.02 | 9.62 | 49.22 | 1.6 |
| Nb | 35.58 | 15.89 | 38.24 | 0.1 |
| Ti | 49.16 | 21.56 | 38.74 | 0.7 |
| Mn | 49.72 | 15.07 | 41.91 | 0.7 |
| Ta | 36.53 | 25.36 | 35.74 | 2.5 |

In Table II set forth below, a detailed analysis of the characteristics of a black matrix structure in accordance with the present invention is shown, the metal employed therein being molybdenum. The Table reveals that although layer thicknesses are critical to the performance of the multilayer stack, variations may be made from the optimum values to yield a structure evidencing satisfactory low reflectance characteristics. This is of particular significance in the four layer structure and is a decided advantage over three layer structures which have more limited tolerances.

TABLE II $Cr/Cr_2O_3/Mo/Cr_2O_3$ Four Layer Antireflector
Cr mirror/Cr2O3/Mo/Cr2O3/glass mirror thickness: 100 nm

| oxide 1 thickness (nm) | Mo thickness (nm) | oxide 2 thickness (nm) | ave reflectance (%) |
|---|---|---|---|
| 35.61 | 10.72 | 42.1 | 0.4 |
| 35.61 | 5.72 | 42.1 | 5.7 |
| 35.61 | 8.22 | 42.1 | 1.3 |
| 35.61 | 10.72 | 42.1 | 0.4 |
| 35.61 | 13.22 | 42.1 | 1.3 |
| 35.61 | 15.72 | 42.1 | 3 |
| 30.61 | 10.72 | 42.1 | 0.6 |
| 33.11 | 10.72 | 42.1 | 0.4 |
| 35.61 | 10.72 | 42.1 | 0.4 |
| 38.11 | 10.72 | 42.1 | 0.5 |
| 40.61 | 10.72 | 42.1 | 0.7 |

TABLE II-continued $Cr/Cr_2O_3/Mo/Cr_2O_3$ Four Layer Antireflector
Cr mirror/Cr2O3/Mo/Cr2O3/glass mirror thickness: 100 nm

| oxide 1 thickness (nm) | Mo thickness (nm) | oxide 2 thickness (nm) | ave reflectance (%) |
|---|---|---|---|
| 35.61 | 10.72 | 37.1 | 0.9 |
| 35.61 | 10.72 | 39.6 | 0.5 |
| 35.61 | 10.72 | 42.1 | 0.4 |
| 35.61 | 10.72 | 44.6 | 0.5 |
| 35.61 | 10.72 | 47.1 | 0.9 |

It should be noted that molybdenum is of particular significance due to etching considerations. As noted previously, the most efficient procedure for fabricating the black matrix of the invention involves depositing films of the constituent components over the entirety of the back surfaces of a front glass substrate of the desired device and then etching out pixel windows. Molybdenum is uniquely suited for this approach since chromium, chromium oxide and molybdenum can all be etched by the same etchant, so assuring that patterning of the black matrix can be effected in one photolithographic etching step, thereby assuring further economies in the preparation thereof.

With reference now to FIG. 1, there is shown a front elevational view in cross-section of a typical black matrix structure in accordance with the invention. Shown in the FIG. is a glass substrate 11 having deposited thereon successively on the back side thereof a first layer of chromium oxide 12, a metal layer 13 selected from among molybdenum, tungsten, vanadium iron, chromium and niobium, a second layer of chromium oxide 14 and chromium mirror 15.

Figure 2:
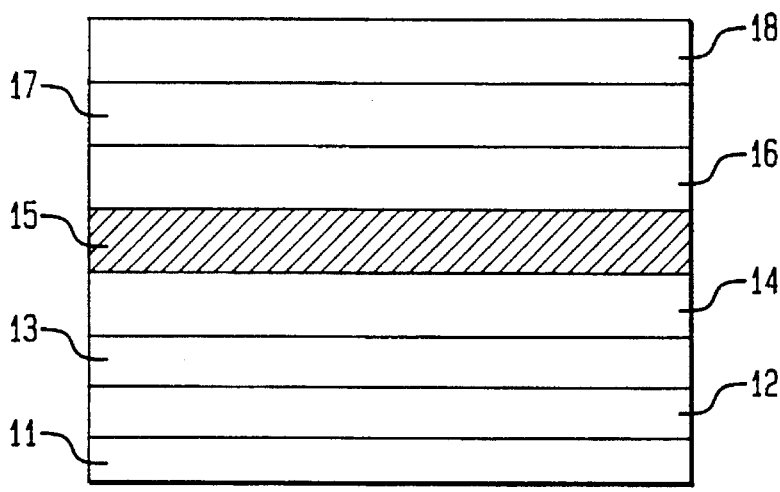
FIG. 2 is a front elevational view cross section of a seven layer black matrix structure prepared in accordance with the invention.

A structure equal in use to that shown in FIG. 1 may be prepared by depositing the same antireflective coating on the back side of the chromium mirror of the four layer stack of FIG. 1. Such a structure is shown in FIG. 2 and this structure comprises a first chromium oxide layer 16, a second chromium oxide layer 18 and intermediate layers 16 and 18 a metal layer 17. This double sided seven layer structure is antireflective with respect both to ambient light incident from outside the display device and to light from the backlight that is integral to the device, light which otherwise would be reflected back into the display electronics.

Figure 3:
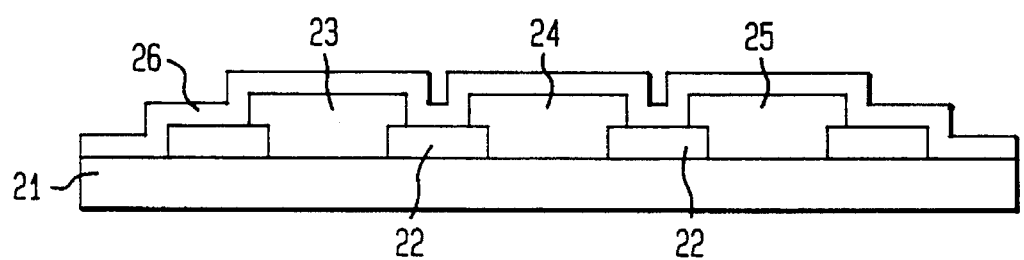
FIG. 3 is a front elevational view in cross section of a color filter including the black matrix of the invention as destined for use in a thin film transistor liquid crystal display.

With reference now to FIG. 3, there is shown a front elevational view in cross-section of a color filter including the black matrix of the invention as depicted in FIG. 1 or FIG. 2 herein. The color filter shown is suitable for use in a thin film transistor liquid crystal display.

Shown in FIG. 3 is a glass substrate 21 having deposited thereon a pattern of black matrix structures 22 prepared as described herein by photolithographic techniques. Matrixes 22 serve as spacers between color filter elements 23, 24 and 25 which are typically, red, green and blue filters, respectively. Deposited upon the top surface of the structure is an electrode 26, for example, indium tin oxide.

Based upon the data set forth in Table I and II, it is evident that the black matrixes prepared in accordance with the described technique evidence superior antireflective characteristics to those of the prior art and offer workers in the art a viable conduit to commercial applications.

While the invention has been described in detail in the foregoing description, it will be appreciated by those skilled in the art that many variations may be made without departing from the spirit and scope of the invention. Thus, for example zirconium and titanium may be employed as the metal member of the black matrix structure. However, it will also be understood by those skilled in the art that such substitution will necessitate alternate means for removal thereof in unwanted areas of the glass substrate since these materials cannot be etched by standard photolithographic techniques. It will also be understood by those skilled in the art that during the sputtering process, variations may occur in the nature of the product deposited. For example, in the deposition of chromium oxide, each layer deposited may not result in stoichiometric $Cr_2O_3$ but may result in mixtures comprising other chromium oxides.

What is claimed is:

1. Liquid crystal device including an antireflective black matrix deposited upon the back side of a glass substrate member wherein said black matrix comprises successively a first chromium oxide layer having a thickness within the range of 35 to 41 nanometers, a metal layer of molybdenum of a thickness within the range of 10–30 nanometers and a second chromium oxide layer of a thickness ranging from 37–42 nanometers, and a mirror.

2. Liquid crystal device in accordance with claim 1 wherein the thickness of the molybdenum layer is 10.72 nanometers and the thickness of the first and second chromium oxide layers is 35.61 and 42.1 nanometers, respectively.

3. Device in accordance with claim 1 further comprising a first chromium oxide layer, a layer of molybdenum and a second chromium oxide layer on the back surface of said chromium mirror.

4. Device in accordance with claim 3 wherein the thickness of the molybdenum layer is 10.72 nanometers and the thickness of the first and second chromium oxide layers is 35.61 and 42.1 nanometers, respectively on the back surface of the chromium mirror.

* * * * *